United States Patent [19]

Sekii et al.

[11] Patent Number: 5,027,232
[45] Date of Patent: Jun. 25, 1991

[54] MAGNETIC RECORDING AND REPRODUCING APPARATUS WITH DOUBLE DECKS SYNCHRONIZED FOR DUBBING

[75] Inventors: Yasuaki Sekii, Tokyo; Yasushi Matusmoto, Kanagawa, both of Japan

[73] Assignee: Sony Corporation, Tokyo, Japan

[21] Appl. No.: 901,296

[22] Filed: Aug. 28, 1986

[30] Foreign Application Priority Data

Aug. 30, 1985 [JP] Japan ............................ 60-191711
Jan. 21, 1986 [JP] Japan ............................ 61-010689

[51] Int. Cl.$^5$ ............................................. G11B 15/44
[52] U.S. Cl. ................................... 360/74.1; 360/15
[58] Field of Search .............. 360/74.1, 15, 74.2, 360/74.3, 74.4, 74.5, 74.6, 74.7, 69, 61, 71; 369/84

[56] References Cited

U.S. PATENT DOCUMENTS

| | | | |
|---|---|---|---|
| 4,121,262 | 10/1978 | Ushio et al. | 360/13 |
| 4,240,120 | 12/1980 | Padwa | 360/15 |
| 4,309,729 | 1/1982 | Kice | 360/74.2 |
| 4,357,636 | 11/1982 | Taketomi et al. | 360/61 |
| 4,373,170 | 2/1983 | Sunaga et al. | 360/74.1 |
| 4,396,958 | 8/1983 | Himeno et al. | 360/74.1 |
| 4,543,618 | 9/1982 | Sato | 360/15 |
| 4,551,775 | 11/1985 | Koizumi et al. | 360/74.1 |
| 4,628,370 | 12/1986 | Fukuoka | 360/74.1 |

*Primary Examiner*—Aristotelis M. Psitos
*Assistant Examiner*—David L. Robertson

[57] ABSTRACT

A magnetic recording and reproducing apparatus having a first tape drive mechanism capable of carrying out at least reproducing transport in one direction and the reverse direction of a first magnetic tape and a second tape drive mechanism capable of carrying out at least recording transport in one direction and the reverse direction of a second magnetic tape, such that during a so-called dubbing operation until reproducing transport in one direction of the first magnetic tape by the first tape drive mechanism and the recording transport in one direction of the second magnetic tape by the second tape drive mechanism are both ended, the tape drive mechanism whose operation is ended first is stopped and is not reversed, so that when the other tape drive mechanism finishes its operation the first and second tape drive mechanisms both start the respective reproducing and recording transports in the reverse direction of the first and second magnetic tapes simultaneously.

1 Claim, 3 Drawing Sheets

MAGNETIC RECORDING AND REPRODUCING APPARATUS WITH DOUBLE DECKS SYNCHRONIZED FOR DUBBING

BACKGROUND OF THE INVENTION

1. Field of the Invention

This invention relates generally to a magnetic recording and reproducing apparatus and, more particularly, to magnetic recording and reproducing apparatus that is intended to carry out a so-called tape dubbing operation.

2. Description of the Background

In addition to a one-way cassette tape recorder in which the tape is transported in the playback or record mode in only one direction, there is now known a so-called auto-reverse cassette tape recorder in which after the transport of the tape in a first direction is completed the tape is then transported in the opposite direction without turning the tape cassette over. Such opposite transporting occurs in the playback or record modes and is not to be confused with the automatic rewind provision which is also well known.

There is also now known a so-called double-deck cassette tape recorder in which two separate tape recorders are combined so that a recorded signal can be reproduced on one cassette tape recorder and recorded on the other, whereby the recorded signal is transferred from one magnetic tape to another. When the recording is to be transferred from one tape to another it is preferable that, just after the dubbing of the first direction of the magnetic tape is ended, the opposite direction is continuously dubbed automatically. Thus, a problem is presented in which when there is a slight discrepancy in the actual lengths of the tapes, the playback, for example, may start its reverse direction shortly before the recording tape has ended, thereby providing a dubbed tape that does not properly match the original. In addition to the slight discrepancies that may exist in the tape lengths, there is also typically a slight discrepancy in the tape drive speeds between various tape transport mechanisms. Therefore, these discrepancies are not of such a large magnitude as to cause information to be lost in the dubbing process but are sufficiently large that one or the other of the playback or record apparatus may commence its reversing operation before the other unit is ready for such reverse operation.

Thus, the duplicate tapes obtained by the dubbing operation are not identical as far as the actual program content on each side of the cassette is concerned.

OBJECTS AND SUMMARY OF THE INVENTION

Accordingly, it is an object of the present invention to provide a magnetic recording and reproducing apparatus that can eliminate the above-noted defects inherent in the prior art.

Another object of this invention is to provide a magnetic recording and reproducing apparatus in which a magnetic tape can be automatically dubbed in a first direction and the tape then reversed and automatically dubbed in the second direction, with both playback and recording apparatus being synchronized.

In accordance with an aspect of the present invention, a magnetic recording and reproducing apparatus is provided to dub a signal recorded on a first magnetic tape to a second magnetic tape in which the playback transport mechanism and recording transport mechanisms that are provided each employ respective end-of-tape detecting elements, so that a control system that is responsive to detection signals from the end-of-tape detectors operates such that unless the playback transport in the one direction of the magnetic tape and the recording transport operating in the same direction of the second magnetic tape end simultaneously, one tape drive mechanism whose operation is finished first will be stopped whereas the other tape drive mechanism is permitted to finish its operation. Following this then both the playback and recording transport in the respective second directions are started simultaneously.

The above and other objects, features, and advantages of the present invention will become apparent from the following detailed description of illustrative embodiments thereof, to be read in conjunction with the accompanying drawings, throughout which like reference numerals designate the same or similar elements and parts.

BRIEF DESCRIPTION OF THE DRAWINGS

FIGS. 3A and 3B are diagrammatic representations useful in explaining the operation of the apparatus of FIG. 1, when the tape synchronizing switch is on.

DESCRIPTION OF PREFERRED EMBODIMENTS

Figure 1:
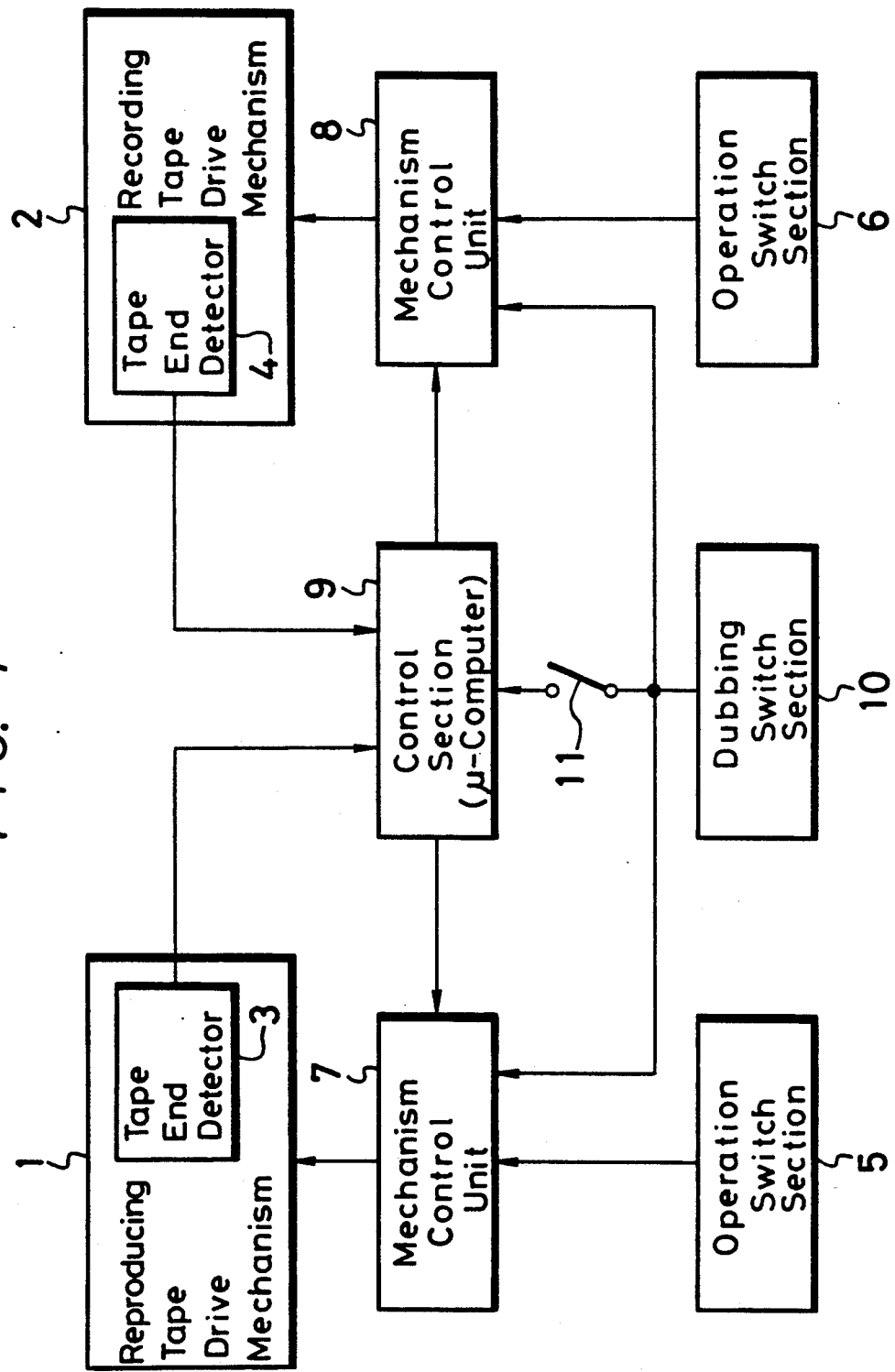
FIG. 1 is a schematic in block diagram form of an embodiment of a magnetic recording and reproducing apparatus according to the present invention.

FIG. 1 schematically represents the functionally important structure of a magnetic recording and reproducing apparatus for dubbing a signal recorded on one magnetic tape to another magnetic tape. More specifically, a reproducing tape drive mechanism 1 can operate in at least three different modes, for example, a first reproducing transport mode for reproducing in a first direction the signals that are recorded on one track of a magnetic tape, a second reproducing transport mode for reproducing in a second direction the signals that are recorded on the magnetic tape in a second track, and a stop mode for stopping transport of the magnetic tape. When the magnetic tape is a cassette, the first and second tracks may be thought of as sides A and B of the cassette. Similarly, a recording tape drive mechanism 2 is provided that can also provide at least the same three kinds of operating modes, such as a recording transport mode for recording, in a first direction, signals in a first track, a second recording transport mode for driving the tape in an opposite direction and recording signals in a second track, and a stop mode for stopping the transport of the magnetic tape. Each of the reproducing and recording tape drive mechanisms 1 and 2 are provided with end of tape detectors 3 and 4, respectively, that operate to provide a signal when the end of the tape is detected. More specifically, each of the tape-end detectors is adapted to detect, for example, the rotation of the tape reel of the cassette and when such tape reel stops rotating it generates an output signal that indicates that the tape has stopped running in the particular direction. As another example of such tape end detector, optical detectors may be provided to detect an end portion of the cassette tape, that is, to detect a transparent leader portion and then to generate an output signal indicative of that tape end. Reproducing tape drive mechanism 1 further includes an operation switch portion that generates information signals to operate the reproducing tape drive mechanism 1 and, in that regard, an operation switch section 6 is similarly provided to generate information signals to operate the recording tape drive mechanism 2.

In order to actually control the respective tape drive mechanisms, a mechanism control unit 7 is provided to receive the operational signals from the switch section 5 and to control the actual operation of the reproducing tape mechanism 1. Similarly, a recording mechanism control unit 8 receives the signals from the operational switch section 6 and controls the the recording tape drive mechanism 2. These mechanism control units 7 and 8 also function to control the actual direction of the tape drive in the respective tape drive mechanisms and, in that regard, are further controlled by signals from a control section 9, which includes a micro-computer containing programmed information to control the operation of the several units. This pre-programmed information will be explained in detail hereinbelow. Control section 9 receives the respective end-of-tape detection signals from detectors 3 and 4 and is adapted to judge the detection signals and to supply to the respective mechanism control units 7 and 8 signals to control the tape drive mechanisms 1 and 2, whereby the magnetic tape is transported in a first direction and then reversed so that the tapes are transported in the opposite direction, as well as to stop the drive of the magnetic tape altogether.

A tape transfer or dubbing switch section 10 is employed to place the appropriate mechanisms into the tape dubbing mode and, more particularly, dubbing switch section 10 operates through mechanism control unit 7 to control reproducing tape drive mechanism 1 in its reproducing mode and similarly operates through mechanism control unit 8 to place recording tape drive mechanism 2 in its recording transport mode, thereby starting the dubbing operation. A synchro-reverse on/-off switch 11, which provides a so-called synchro-reverse operation, is an important feature of the present invention and will be described in detail hereinafter. Nevertheless, it is pointed out that synchro-reverse on/off switch 11 controls whether the dubbing signal from dubbing switch section 10 is transmitted to control section 9.

In the operation of the inventive system of FIG. 1, assuming that synchro-reverse switch 11 is off or open as shown in FIG. 1, this means that the dubbing will be performed by the apparatus essentially using the known prior art method, where no accommodation is provided for differences in the two tape lengths or differences in tape drive speeds between the respective recording and playback drive systems. More particularly, assuming that dubbing is commenced by actuation of dubbing switch section 10, the appropriate activation signals are sent to reproducing mechanism control unit 7 and recording mechanism control unit 8, whereby control unit 7 causes reproducing tape drive mechanism 1 to perform a reproducing transport of the tape in a first direction, while mechanism control unit 8 causes the recording tape drive mechanism 2 to carry out the recording tape transport in that same first direction and, therefore, the dubbing operation is commenced.

Continuing with this example of operation, when the magnetic tape that is being driven by reproducing tape drive mechanism 1 reaches its end, such end state will be detected by tape-end detector 3 and the resultant detection signal is fed to control section 9, whereby control section 9 issues an instruction to mechanism control unit 7 to cause reproducing tape drive mechanism 1 to reverse itself and to transport the tape being reproduced or played back in the opposite direction. Thus, it is seen then at the point when the reproducing tape is being reversed in direction, that it is not known whether the recording transport is still driving the recording tape in the first direction or whether it has also been reversed to drive to recording tape in the reverse direction. This then illustrates the problem that is inherent in the known prior art system. Further, when the recording tape in recording tape drive mechanism 2 reaches its end, such situation will be immediately detected by tape-end detector 4 and the appropriate detection signal fed to control section 9, which then provides reverse drive direction instruction signal to recording mechanism control section 8, whereby recording tape drive mechanism 2 proceeds to drive the recording tape in the opposite direction relative to the first direction, which is the so-called second direction. Again, it is seen that this tape drive reversing operation on the recording tape is independent of the drive direction of the playback tape. Briefly stated, at the instant the reproducing and recording tape drive mechanisms 1 and 2 reach the end of the first drive direction, they independently reverse their drive directions to drive the tapes in the opposite direction, thereby playing back and recording the information in respective separate tracks from those utilized in that first drive direction. It is noted that the different drive directions correspond to the different tracks, which correspond to sides A and B in an audio tape cassette.

As indicated above, this independent tape drive direction control does not present a problem when the tapes being dubbed to and/or from are of completely different length, for example, if one is a 45 minute tape and the other is a 60 minute tape, because they are so considerably different in their respective recording times that there is no contemplation that the material on the respective sides of the tapes should match exactly. The problem solved by the present invention arises, however, when the magnetic tapes are of the same generic length but the lengths have some minor non-uniformity due to manufacturing tolerances, tape stretch, or the like, as well as the fact that the actual tape transportation speeds of the two tape drive mechanisms may not coincide exactly. In that situation even if the dubbing operation in the first direction begins simultaneously at the very beginning of each tape, the two tape drive mechanisms will almost always finish the running operation in the first direction at slightly different times. In other words, in the dub tape which is made by transporting in both directions using an automatic reversing dubbing cassette recording and reproducing apparatus, the starting portion in the opposite direction, that is, the second track, of the original tape may well be dubbed at the very last portion of the first tracks that are being recorded in the first direction, or the first portion in the opposite direction in the second tracks of the original tape may be dubbed at the very end of the first track in the tape being dubbed.

Thus, in the operation of the apparatus of FIG. 1 when the synchro-reverse switch 11 is on or closed in the embodiment of FIG. 1, and the dubbing operation is carried out as described above, that is, the information signal from dubbing switch section 10 is also fed to control section 9, when the reproducing tape drive mechanism 1 stops the reproducing transport of the tape in the first direction, which situation is detected by tape-end detector 3 with the appropriate detection signal being supplied to control section 9. If recording tape drive mechanism 2 is still recording and has not reached the end of the recording tape, as would be signaled by a tape-end detection signal from tape-end detector 4 to control section 9, control section 9 will provide a stop signal to mechanism control section 7 in order to place reproducing tape drive mechanism 1 in the stop mode and then subsequently in the standby mode. On the other hand, if the recording tape drive mechanism 2 reaches the end of the recording tape being driven in the first detection, and the reproducing tape drive mechanism 1 is still driving the original tape, then control section 9 will provide a stop signal to mechanism control unit 8 to stop the recording tape and place recording tape drive mechanism 2 in the stop mode and, subsequently, into the standby mode.

Thus, when one tape drive mechanism is placed in the standby mode while the other tape drive mechanism is permitted to reach the end of its tape thereafter, for example, when recording tape drive mechanism 2 is still recording while reproducing tape drive mechanism 1 has been placed in the standby mode, in keeping with the detection by tape-end detector 4, control section 9 detects that the tape-end detection signal had already been supplied from tape end detector 3 and that dubbing switch 11 is turned on (closed) and it generates a control signal to the mechanism control unit 7 so that reproducing tape drive mechanism 1 performs the reproducing operation in the opposite direction and, at the same time, generates a control signal to mechanism control section 8 so that recording tape drive mechanism 2 records the signals while the magnetic tape is being driven in the opposite direction.

On the other hand, when reproducing tape drive mechanism 1 is finishing the reproducing tape drive in the first direction while recording tap drive mechanism 2 has already been placed in the standby mode, as soon as control section 9 receives the tape-end detection signal from end detector 3, it simultaneously provides control signals to mechanism control units 7 and 8 so that the reproducing and recording tape drive mechanisms 1 and 2 will carry out the transport of the magnetic tape in the opposite direction starting at the same time. As a result, the reproducing and recording tape drive mechanisms 1 and 2 will then commence the transport of the tapes in the opposite direction, so that the respective contents thereof are dubbed in at least the first portion of the magnetic tape in this second direction.

Figure 2A:
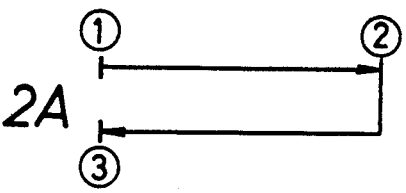
FIGS. 2A and 2B are diagrammatic representations useful in explaining the operation of the apparatus of FIG. 1, when the tape synchronizing switch is off.
Figure 2A:
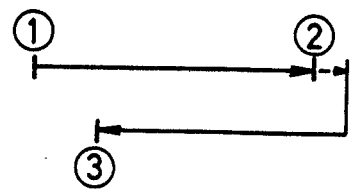
Figure 2B:
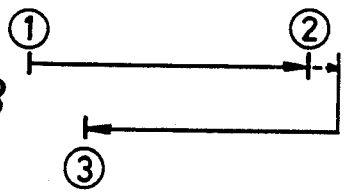
Figure 2B:
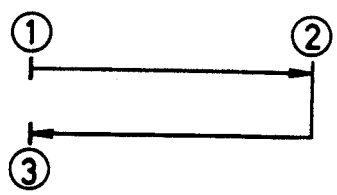
Figure 3A:
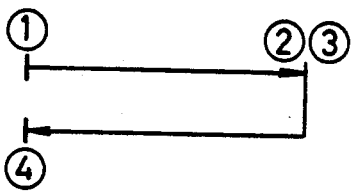
Figure 3A:
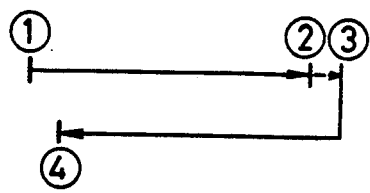
Figure 3B:
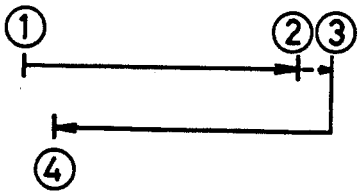
Figure 3B:
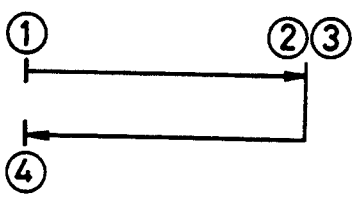

Turning now to FIGS. 2A and 2B and FIGS. 3A and 3B, FIGS. 2A and 2B illustrate the situation in which the synchro-reverse on/off switch 11 is turned off or open, whereas FIGS. 3A and 3B illustrate the situation when the synchro-reverse on/off switch 11 is turned on or closed. The diagrams on the left side represent the playback or reproducing transport mechanism and the diagrams on the right side represent the recording transport mechanism, and throughout all of these figures arrows pointing toward the right-hand side indicate tape transport in a first direction and arrows pointing toward the left-hand side indicate tape transport in the opposite or second tape direction. FIGS. 2A and 3A illustrate the case in which the reproducing tape is short in length, or high in running speed, whereas FIGS. 2B and 3B represent the case in which the recording tape is short, or high in running speed, and the encircled references numerals 1 through 4 indicate the same time points relative to the tape transport among the several figures. In FIG. 2A, in which the synchro-reverse on/off switch 11 is off, even though the reproducing and recording tape drive mechanisms 1 and 2 both commence the respective tape transport at the respective beginnings thereof, as represented at time points ① at some time later when the reproducing tape drive mechanism 1 has finished the transport in the first direction of the reproducing magnetic tape, recording tape drive mechanism 2 will not yet have finished transport in the first direction of the magnetic tape. Thus, on that portion of the tape at the time point ② in the recording tape mechanism 2, there would normally be dubbed the first portion of the opposite direction or second track of the reproducing tape in reproducing tape drive mechanism 1. This is seen by the portion of the recording tape that extends beyond time point ② in FIG. 2A. Similarly, in the situation represented in FIG. 2B, where synchro-reverse on/off switch 11 is still turned off, even though the two tape drive mechanisms 1 and 2 both commence simultaneously from the same time point ①, at some time point thereafter, when recording tape drive mechanism 2 has already finished transporting the tape in the first direction reproducing tape drive mechanism 1 will not yet have finished the transport in the first direction of the reproducing magnetic tape. As a result, the portion of the tape in reproducing tape drive mechanism 1 following the time point ② is dubbed at the beginning of the second track in the opposite direction of the recording magnetic tape in recording tape drive mechanism 2.

When the synchro-reverse on/off switch 11 is turned on or closed and the reproducing and recording tape drive mechanisms 1 and 2 both commence the transport of the tape in the first direction from time point ①, and tape drive mechanism 1 stops transport of the reproducing tape when it reaches the end of the tape, as indicated at time point ②, recording tape drive mechanism 2 will still be transporting the recording tape from time point ② up until time point ③, at which time recording tape drive transport mechanism 2 will stop the transport of the tape in the first direction. Then, at some time point ③ thereafter, reproducing and recording tape drive mechanisms 1 and 2 will both start simultaneously to transport the magnetic tapes in the opposite directions for reproducing and recording of the so-called second tracks. Subsequently, the transport operations will be stopped at time points ④ which represent the end of the tape in the opposite or the second direction. As shown in FIG. 3B, where the synchro-reverse on/off switch 11 is closed or on, even when the reproducing and recording tape drive mechanisms 1 and 2 both start tape transport in the same direction and at the same time point ①, recording tape drive mechanism 2 will stop transport of the tape at a time point ②, at which it has finished the tape transport in the first direction, while reproducing tape drive mechanism 1 continues to transport the tape from time point ② up to time point ③, at which point reproducing tape drive mechanism 1 is finished with the tape transport in the first direction. Then at some time point ③ thereafter recording and reproducing tape drive mechanisms 1 and 2 will both simultaneously start the transport in the opposite direction of the magnetic tapes and will continue such transport until time point ④.

Thus, utilizing the apparatus of FIG. 1 and the above-described operations according to the present invention and due in part to the use of the synchro-reverse function of switch 11, when a user intends to identically dub the first direction and the opposite direction (sides A and B) of tapes that have substantially identical lengths, the problems known in the prior art are eliminated.

As a second example, if reproducing or playback tape drive mechanism 1 finishes tape transport in the first direction before the recording tape drive mechanism has ended, that is, if the tape-end detection signal is supplied from tape-end detector 3 before such detection signal is supplied by tape-end detector 4, control section 9 can operate to supply to mechanism control unit 7 a stop signal to stop reproducing tape drive mechanism 1 and to place it in a standby mode. On the other hand, when recording tape drive mechanism 2 finishes transport in the first direction of the magnetic tape before reproducing tape drive mechanism 1, and tape-end detector produces an end detection signal before reproducing tape drive mechanism 1 has reached the end of the reproducing tape, control section 9 can provide to mechanism control unit 7 a control signal that places reproducing tape drive mechanism 1 in the fast forward mode, thereby causing reproducing tape drive mechanism 1 to transport the tape immediately to its tape end in the fast forward mode.

Accordingly, when reproducing tape drive mechanism 1 is in the standby mode and recording tape drive mechanism 2 reaches the end of the tape in the first direction, as indicated by a detection signal from tape-end detector 4 to control section 9, control section 9 detects that the end detection signal and has already been supplied from tape-end detector 3 and that the synchro-reverse switch 11 is on, and control section 9 generates a control output signal to mechanism control unit 7 so that reproducing tape drive mechanism 1 carries out the reproducing tape transport in the opposite direction and also generates a control output signal to mechanism control unit 8, so that the recording tape drive mechanism 2 carries out the recording transport in the opposite direction as well.

On the other hand, when it is recording tape drive mechanism 2 that finishes its operation first and reproducing or playback tape drive mechanism 1 is still transporting the magnetic tape in the first direction, control section 9 operates by way of mechanism control unit 7 to playback tape drive mechanism 1 so that it is placed in the fast forward mode, at a time when recording tape drive mechanism 2 has already finished its operation. Thus, the reproducing tape is fast forwarded to its end. Once the end detection signal is provided by tape-end detector 3 to control section 9, then control section 9 provides to mechanism control units 7 and 8 the control signals by which recording and reproducing tape drive mechanisms 2 and 1 will transport the magnetic tape in the opposite direction. Consequently, reproducing and recording tape drive mechanisms 1 and 2 both start transporting the magnetic tape simultaneously in the opposite direction so that the same contents can be dubbed at least in the first portions of the magnetic tapes. Furthermore, when the operation of recording tape drive mechanism 1 is ended, reproducing tape drive mechanism 2 fast forwards the tape to its tape end so that the standby time of the recording tape drive mechanism 2 is reduced.

Figure 4:
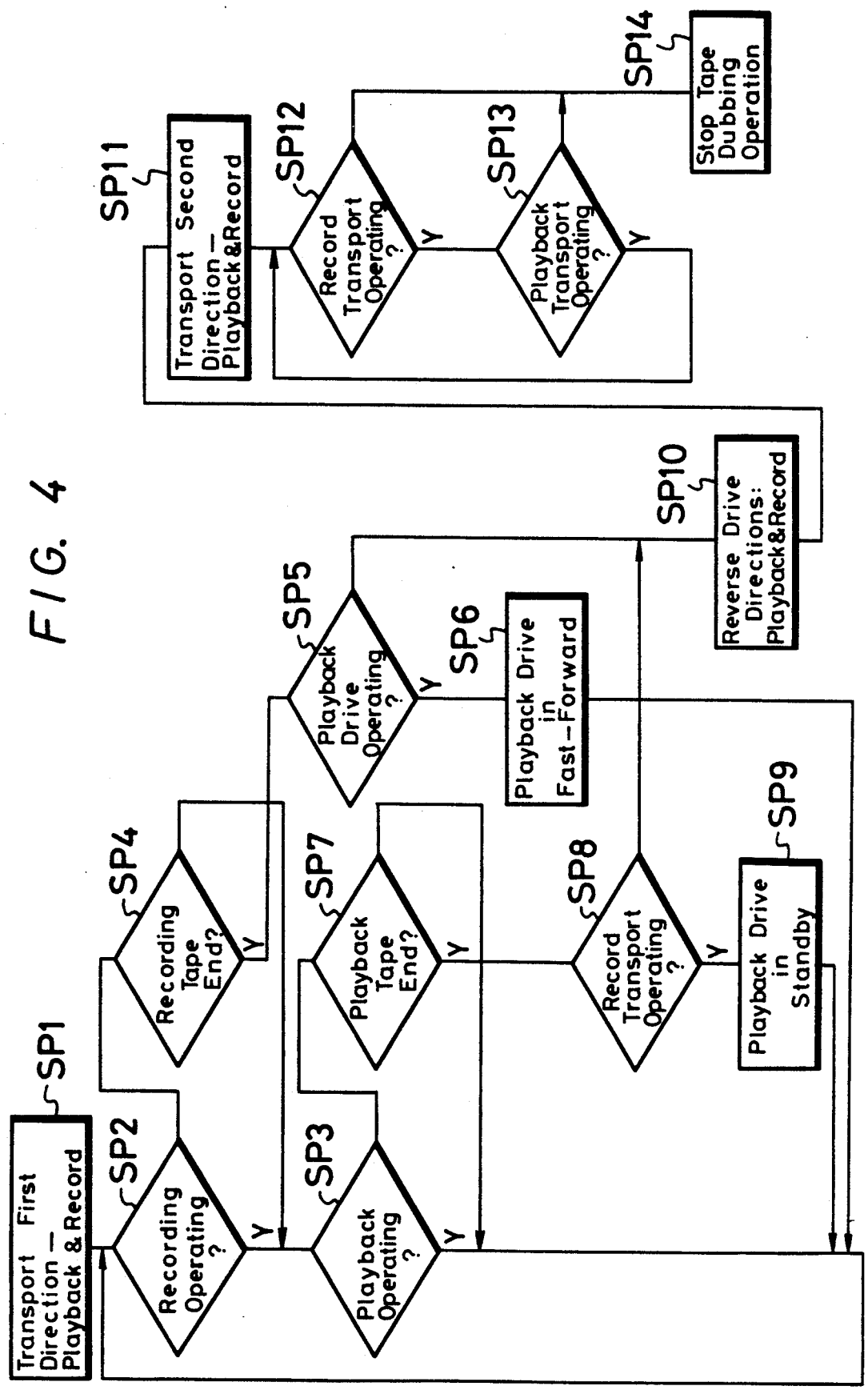
FIG. 4 is a flow chart useful in explaining the operation of a micro-computer contained within a control section of the apparatus of FIG. 1.

Referring to FIG. 4, an example of the operation of the micro-computer contained within control section 9 is described in detail with reference to a flow chart, in which the dubbing operation of the first direction of magnetic tape is indicated as commencing with the start step SP1, and reproducing and recording tape drive mechanisms 1 and 2 both enter the transport modes in the first direction at the same time. Of course, it is understood that reproducing tape drive mechanism 1 is placed in the reproducing mode and recording tape drive mechanism 2 is placed in the recording mode. Thereafter, on the basis of the end detection signal from tape-end detector 4, it is determined in step SP2 whether the recording tape drive mechanism 2 is operating. If it is operating, then on the basis of the detection signal from tape-end detector 3, it is determined in step SP3 whether or not the reproducing tape drive mechanism 1 is operating and if so, the dubbing operation continues.

If in step SP2 it was determined that recording tape drive mechanism 2 is not operating, then it is determined in step SP4 whether the operation has been stopped after the tape has reached its end, as might be determined by tape-end detector 4. If it is judged in step SP4 that the operation has stopped, then in step SP5 it is determined whether the reproducing tape drive mechanism is being operated. If it is being operated then in step SP6, the reproducing tape drive mechanism 1 is commanded to fast forward the tape to its tape end. In other words, if the operation of recording tape drive mechanism 2 is stopped during the dubbing operation in the first direction of the magnetic tape, the reproducing tape drive mechanism is immediately placed in the fast forward mode, thereby avoiding the useless time period that is required when the recording tape drive mechanism is placed in the standby mode until the reproducing tape drive mechanism finishes the playback operation.

On the other hand, if the recording tape end detection signal was not detected in step SP4, then it is intended to be determined in step SP3 whether the playback transport mechanism 1 is operating and if not, then it is determined in step SP7 whether the reproducing tape end has been detected. If the reproducing tape end has not been detected, then the operation is still ongoing and the check in step SP2 of the recording operation is repeated. On the other hand, if the playback tape is stopped, then it is determined in step SP8 whether the recording transport operation is ongoing and, if so, at step SP9 the reproducing tape drive mechanism is placed in the standby mode and a check is made back to determine whether the recording tape transport mechanism is operating.

On the other hand, if it is determined in step SP5 that the playback tape drive mechanism is not operating or if it is determined in step SP8 that the record transport tape driving mechanism is not operating, then both the reproducing and recording tape drive mechanisms are instructed to reverse simultaneously the direction of drive of the magnetic tape. Then, the dubbing operation commences in the other direction of the tape, as represented at step SP11.

It is then determined in step SP12 whether the recording tape drive mechanism 2 is operating and, if so, it is determined whether the playback tape drive mechanism 1 is operating. If it is determined to be operating in step SP13, then the dubbing operation continues and the two tape drive mechanisms are continuously monitored. If it is determined either in step SP12 that the recording tape drive mechanism 2 is not operating or if it is determined in step SP13 that the playback tape drive mechanism 1 is not operating then the appropriate signal is provided to stop the tape dubbing operation immediately, thereby ending the operation. In other words, during the period in which the dubbing operation in the second or reverse direction on the magnetic tape is being carried out if one or the other of the reproducing and recording tape drive mechanism stops operating, although there remains a portion of the tape in the other of the tapes, the dubbing operation is ended immediately.

According to the second example of the present invention as described above, if during the dubbing operation the second tape drive mechanism stops its recording operation while the first tape drive mechanism is placed in the reproducing operation, the first tape drive mechanism will be commanded to fast-forward the tape to its end so that the waiting time between the time that the first tape drive mechanism stops and the second tape drive mechanism stops will be reduced. Accordingly, useless time is eliminated and rapid dubbing operation becomes possible.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. A magnetic reproducing and recording apparatus for dubbing a signal recorded on both sides of a master magnetic tape to both sides of a copy magnetic tape, said apparatus comprising:

a first tape drive mechanism for transport in a first direction and in a reverse direction of the master magnetic tape;

first detecting means for detecting at least one tape end of the master magnetic tape and producing a detection signal;

a second tape drive mechanism for transport in a first direction and in a reverse direction of the copy magnetic tape;

second detecting means for detecting at least one end of the copy magnetic tape and producing a detection signal;

reproducing and recording mans for reproducing said signal recorded on said master magnetic tape and recording said reproduced signal on said copy magnetic tape during simultaneous transport by said first and second tape drive mechanisms in said first direction and also during simultaneous transport by said first and second tape drive mechanisms in said reverse direction;

control means responsive to said detection signals from said first and second detecting means for controlling said first and second tape drive mechanisms so that a tape drive mechanism whose operation in said first direction is finished first is stopped while the other tape drive mechanism finishes its operation in said first direction, and thereafter the first and second tape drive mechanisms simultaneously begin to effect reproducing and recording transport, respectively, in said reverse direction;

whereby the signal recorded at the beginning of each side of the copy tape is identical to the signal recorded at the beginning of the corresponding side of the master tape;

in which said control means carries out such control that when the tape end of said copy magnetic tape is detected by said second detecting means while said first tape drive mechanism is carrying out the reproducing transport, said first tape drive mechanism fast-forwards said master magnetic tape to its tape end.

* * * * *